Sept. 2, 1958 G. W. SMALE 2,850,716
ATTENTION ARRESTING SIGNAL LIGHT
Filed March 19, 1956 2 Sheets-Sheet 1
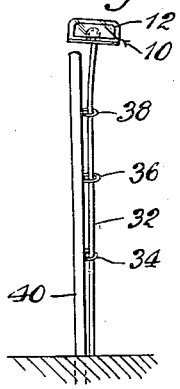
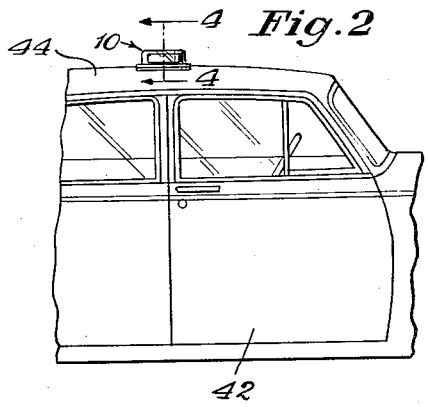
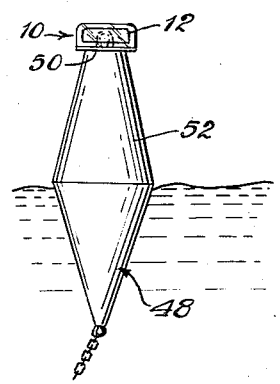
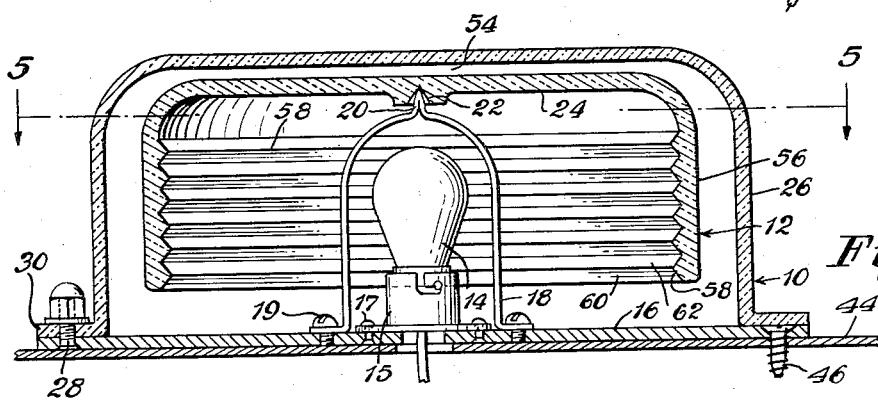
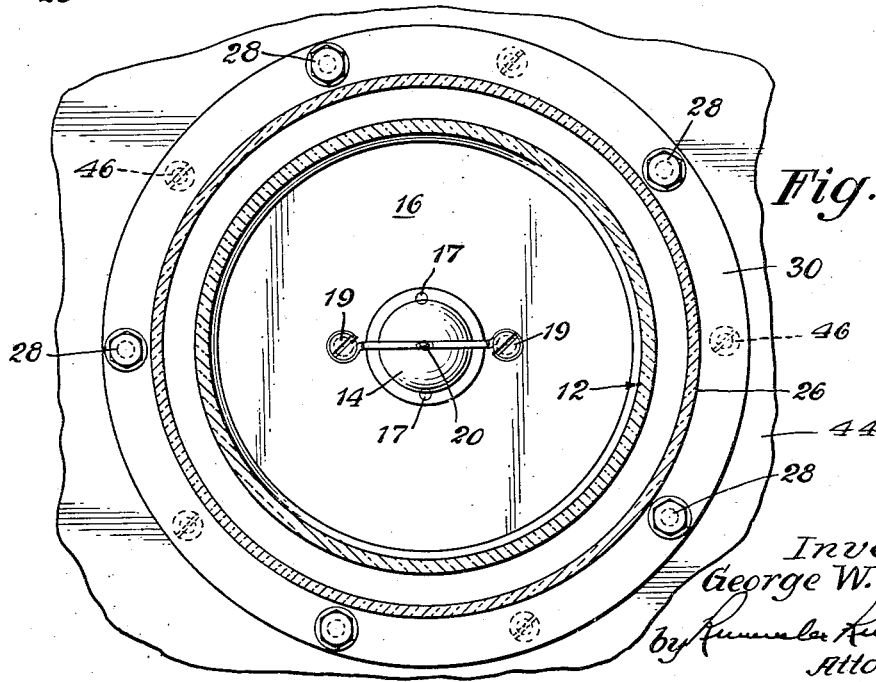
Inventor
George W. Smale
by
Attorneys Sept. 2, 1958  G. W. SMALE  2,850,716
ATTENTION ARRESTING SIGNAL LIGHT
Filed March 19, 1956  2 Sheets-Sheet 2
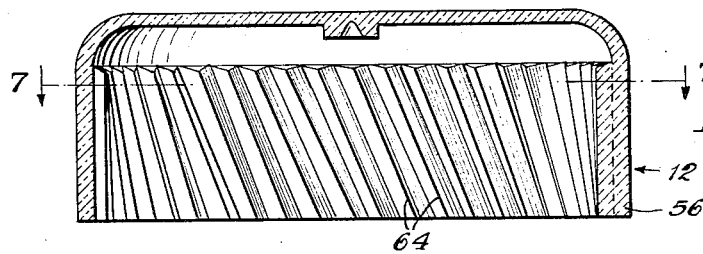
Fig.6
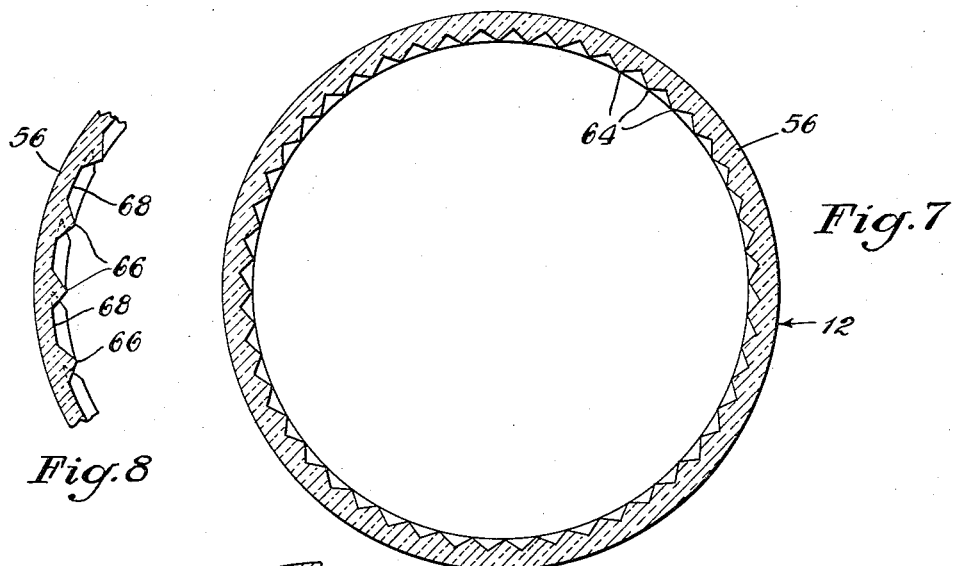
Fig.7
Fig.8
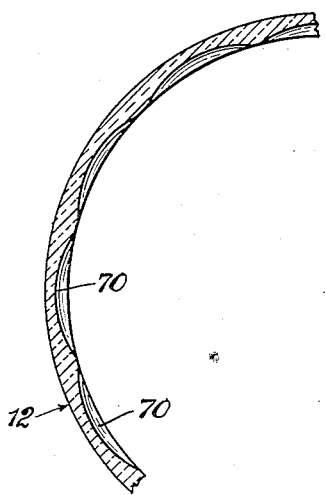
Fig.10
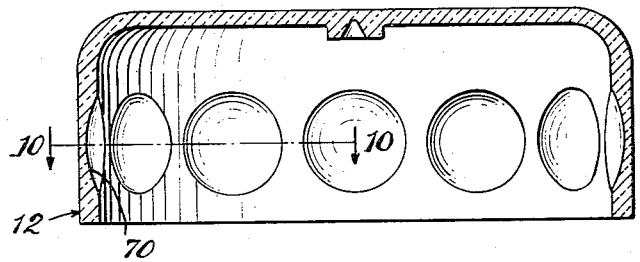
Fig.9
Inventor
George W. Smale
by Rummler, Rummler & Snow
Attorneys

United States Patent Office 2,850,716
Patented Sept. 2, 1958

2,850,716

ATTENTION ARRESTING SIGNAL LIGHT

George W. Smale, Chicago, Ill.

Application March 19, 1956, Serial No. 572,353

3 Claims. (Cl. 340—49)

This invention relates to attention-arresting signal lights and more particularly to flashing signal lights having a movable lens system actuated by natural vibrations inherent in the supporting structure of the device to transmit moving beams of light in substantially all directions from a central light source.

Various types of signals have been available heretofore for producing flashing light beams for a number of purposes. For example, signal lights having motor actuated means for producing regularly flashing beams are in common use; and lamps have been devised which have a moving annular screen rotatable on its axis by means of heat from a light bulb. Again, intermittent lighting has been used in combination with the lens, so that light beams are produced at regular intervals; and specially designed drive systems have been employed for effecting a uniformly changing light beam path.

It is an object of the present invention, however, to provide a flashing signal or warning light which is of greatly simplified construction in comparison with previously available signal light means, and which nevertheless has increased attention-arresting value and affords continuous visual interest without the use of a motor as the actuating means.

Another object of the invention is to produce an attention-arresting or warning signal means which continually emits flashes of light in response to the normal and irregular vibration of its support.

Another object of the invention is to produce a signal light of the type indicated which may be extremely compact and economically constructed of conventional materials and with a minimum of parts.

Another object is to produce a signal light which flashes light beams moving in an irregular and uncontrolled pattern, so that the natural tendency to ignore regularly produced signals is overcome and the viewer's attention is attracted to the device.

Another object of the invention is to produce a signal light which is suitable for use in a prominent position at the entrance to a restaurant or the like, as a marker or warning device for boats, or in any of a variety of other applications where the attention of passersby must be caught and held with a high degree of reliability.

Other objects and advantages of the invention will become apparent as the description proceeds in accordance with the accompanying drawings showing a specific embodiment of the invention and in which:

Fig. 1 is a side elevation of a signal light according to the invention in combination with a flexible vertical mounting pole and retaining means therefor;

Fig. 2 is a fragmentary view of a signal light according to the invention disposed on a roof of a vehicle such as a boat or car;

Fig. 3 is a side elevational view of a signal light according to the invention as mounted on top of a marker or warning buoy;

Fig. 4 is a vertical sectional view of the signal light of the invention taken through lines 4—4 of Fig. 2;

Fig. 5 is a similar enlarged view taken in horizontal section through the lines 5—5 of Fig. 4;

Fig. 6 is a vertical sectional view of a second form of the lens of the signal light;

Fig. 7 is a horizontal sectional view of the same taken through lines 7—7 of Fig. 6;

Fig. 8 is a fragmentary horizontal sectional view of a third form of the lens;

Fig. 9 is a vertical sectional view of still another form of lens system for the invention; and Fig. 10 is a fragmentary horizontal sectional view of the same taken through lines 10—10 of Fig. 9.

Referring now to Figs 1 through 4, the signal light 10 of the invention, comprises an annular dome-like lens 12, a light source 14 having a socket 15 secured to a support base 16 by means of screws 17, an inverted U-shaped bracket 18 fastened to base 16 by screws 19, the bracket having a central pivot point 20 positioned above light 14 and received in a conical bearing recess 22 defined by upper wall 24 of the lens 12, and a transparent cover 26 overlying the lens and secured to base 16 by bolts 28 in a peripheral flange 30 formed integrally with the cover.

The signal light 10 includes a means for imparting vibrations to the support base 16 and the lens 12. In the embodiment of Fig. 1 the vibrating means comprises a vertical pole 32, of a strong and relatively flexible material fixed at its lower end, and the support base 16 of the signal is affixed on the upper end of the pole in axial alignment. In order to limit the lateral movement of pole 32, one or more rings, such as at 34, 36 and 38 are secured in vertical registration to a rigid standard 40 which is mounted in substantially parallel closely spaced relation to pole 32 with pole 32 retained in the rings. The rings have a diameter which is substantially greater than the diameter of the pole 32 but sufficiently small so that the pole is held relatively upright as it is caused to swing or move by air movements in the surrounding atmosphere. The pole 32 and standard 40 may be mounted in any suitable base such as cement or the like, and it will be apparent that as the pole is swayed by air currents it will strike against the retaining rings and transmit a jarring impulse to the light 10.

Referring to Fig. 2 a second arrangement of the invention is shown wherein the vibrations are provided by a vehicle 42, which may be a boat or a car or the like, the support base 16 being secured to the roof 44 of the vehicle by screws 46, or the like, as best seen in Fig. 4. Thus, when the vehicle is in motion, its natural vibration will be transmitted through the support 16 to lens 12 as will be hereinafter further described.

A third means for imparting vibration to the lens is shown in Fig. 3 wherein a floating buoy 48 has support base 16 affixed upon the top 50 of its frustoconical upper section 52. It will be readily apparent that the design of the respective vibrating means, and the manner in which the light is mounted thereon, may be altered in a variety of ways and that in each case movement or vibration from a natural source, inherent in the particular support, is transmitted to the light structure.

Referring again to Fig. 4, it will be seen that any vibration from the supporting means is immediately imparted to the lens 12, and that because of the configuration of recess 22, whose sides preferably are tapered at an angle somewhat greater than the angle formed by conical point 20, a pivotal movement or rocking of the lens results. The recess 22 has a predetermined depth which is greater than the spacing between the upper wall 24 of the lens at the pivot point and the wall 54 of cover, to insure that the lens will not accidentally fall off from the pivot point 20.

Since the light beams from the lens 12 generally must be perceived by a viewer who is not necessarily on a level with the light 10, refractive formations are formed in a depending annular skirt 56 of the lens which is in horizontal registration with light 14. Thus, as the bowl-shaped lens is vibrated, flashes of light will be continually sent in many directions within a very wide viewing range.

It will be readily understood that other means for imparting vibrational movement from the base 16 to the lens 12 may be utilized, such for example as springs disposed peripherally around the lens in supporting relation to the skirt 56 or means for hanging the lens from the cover member 26. Also, vibrational means may be employed for varying the position of the light source relative to the lens.

As shown in Fig. 4, a preferred form of the lens 12 utilizes a plurality of substantially V-shaped cross-sectional ridges 58 extending in parallel contiguous relationship around the inner circumferential surface of the depending skirt 56. Thus, as the lens is pivoted in response to vibrational movement imparted to the base support 16, the surfaces 60 and 62 of ridges 58 will refract light rays which pass through the lens in directions which change continually, to effect a brilliant, coruscating signal. The ridges may also be given different colors, either by painting them with a light-permeable substance or imbedding the pigmentation in the glass of the lens.

Referring now to Figs. 6 and 7 a second form of lens is shown wherein ridges 64 of substantially V-shaped cross-sectional configuration are disposed around the inner surface of the depending skirt 56 at an acute angle relative to the central axis of the lens. This construction causes a change in the direction of the refracted rays in response to complex movement of the lens about both its vertical and its transverse axes.

The ridges 66 shown in Fig. 8 preserve the same alignment as those in Fig. 6 but are spaced apart a predetermined uniform distance so that the flat inner surfaces 68 of the depending skirt 56 provide a contrasting reflective surface which adds further variety to the visual impression produced.

Yet another embodiment of the invention is shown in Figs. 9 and 10 wherein a plurality of individual concave lens formations 70 are defined by angularly spaced indentations in the skirt 56 of the movable lens body 12. As best shown in Fig. 10, the formations 70 have a substantially ellipsoidal cross-section so that they act as individual beam producing elements. Thus a plurality of continuously moving individual light beams of substantial intensity are produced.

The lens 12 may be made from any of a variety of materials such as glass, plastic or other transparent substance capable of taking a high surface polish. If desired some of the refractive formations may be coated with a suitable color producing substance. The cover 26 is likewise preferably formed of glass, although other materials may be utilized as desired or as needed to meet special conditions such as might create a hazard of breakage, for example. Both the lens 12 and cover 26 are manufactured in accordance with techniques which are standard and well known to those skilled in the art.

The assembly of the device is also simple and readily understood, since all that is required is the fastening of the light 14 and the bracket 18 to the base 16 as described, whereupon the cover 26 is bolted to the base so as to secure the lens in position on the pivot point 20 of the bracket. In actual practice, various shapes of the lens 12 may be used, such as a frustro-conical shape, and any suitable beam producing formation in the lens body may be employed. Also, the cover 26 may be dispensed with, if desired, and the light 14 may be replaced by any sufficiently strong light source in any position where the rays therefrom will be directed with visual impact. Also, if desired, suitable rubber bumpers, not shown, may be employed to limit the swinging movement of the lens body 12 to avoid possibility of breakage where heavy vibration or large swing amplitudes may be imparted to the device.

There has thus been provided an attention-arresting signal or warning device which requires an absolute minimum of parts to achieve a very striking effect. There is no need for replacement of parts such as is required where a specially designed motor is used in conjunction with the signal, and the techniques of manufacture of the device and the materials used are standard and conventional. Due to its compactness, the signal can be readily stored or packed for shipping. The device is attractive in appearance and this impression is augmented by the various refracting formations of the lens elements.

Other advantages of this invention reside in the irregular and inconsistent paths of the various light beams and the wide dispersal thereof, both upwards as well as horizontally, whereby an extremely wide area of attention arresting coverage is obtained; and in the fact that actuation of the improved signal device is wholly derived from natural motion producing forces which require no attention for their continued operation.

Although but one specific embodiment of this invention is herein shown and described it will be understood that details of the construction shown may be altered or omitted without departing from the spirit of the invention as defined by the following claims.

I claim:

1. An attention arresting signal light comprising a disk-like base member, a transparent cover member secured to said base member, a hollow dome-like lens arranged within said transparent member for oscillatory movement on a bracket, a light source carried by said base member, a conical recess in said lens member, and a point-like pivot carried by said bracket extending from said base member and cooperating with said recess to permit the oscillatory movement of said dome-like lens, said cover having an upper wall spaced from the adjacent top center surface of said lens a distance substantially less than the depth of said recess whereby said lens is retained against accidental dislodgment from said bracket upon movement of said base.

2. An attention arresting signal light as claimed in claim 1, wherein said lens is provided with formations for producing moving light beams in response to vibrations imparted to the lens supporting means through said base means.

3. An attention arresting signal light as claimed in claim 1, wherein bumper means are secured to said lens member to control the amplitude of oscillations thereof.

References Cited in the file of this patent

UNITED STATES PATENTS

| 1,840,098 | Hobson | Jan. 5, 1932 |
| 2,274,217 | Sauer | Feb. 24, 1942 |
| 2,367,818 | Diehl | Jan. 23, 1945 |
| 2,398,974 | Storm | Apr. 23, 1946 |
| 2,496,601 | Schamblin | Feb. 7, 1950 |